Nov. 5, 1968  E. P. WEBER ET AL  3,409,472
POROUS PLATE AND METHOD OF MAKING SAME
Filed Aug. 13, 1962  2 Sheets-Sheet 1

INVENTORS
EDWARD P. WEBER,
& EDWARD L. THELLMANN
BY
RICHEY, McNENNY & FARRINGTON

William J. Flynn
ATTORNEYS

Nov. 5, 1968     E. P. WEBER ET AL     3,409,472
POROUS PLATE AND METHOD OF MAKING SAME
Filed Aug. 13, 1962                    2 Sheets-Sheet 2

INVENTORS
EDWARD P. WEBER,
& EDWARD L. THELLMANN
BY
RICHEY, McNENNY & FARRINGTON
William J. Flynn
ATTORNEYS

United States Patent Office 3,409,472
Patented Nov. 5, 1968

3,409,472
POROUS PLATE AND METHOD OF MAKING SAME
Edward P. Weber, Parma, and Edward L. Thellmann, Walton Hills, Ohio, assignors to Clevite Corporation, a corporation of Ohio
Filed Aug. 13, 1962, Ser. No. 216,640
3 Claims. (Cl. 136—120)

This invention relates to porous plate usable as a fuel cell electrode and to a method of making the same.

It has been proposed heretofore to provide dual porosity electrodes for fuel cells in which the finer porosity layer of the electrode is to be contacted by the fuel cell electrolyte. Prior to the present invention such electrodes have not been entirely satisfactory from the standpoints of the rigidity and strength necessary to withstand the pressure differential existing on opposite sides of the electrode in the fuel cell. Also, prior electrodes of this general type have not been entirely adequate to withstand shock and vibration.

The present invention is directed to an improved porous plate, usable as a fuel cell electrode, which overcomes these difficulties, and to a novel method of making such an improved porous plate.

Accordingly, it is an object of this invention to provide a novel and improved porous plate, usable as fuel cell electrode.

It is also an object of this invention to provide such a plate having improved rigidity, strength, shock resistance and vibration resistance.

Another object of this invention is to provide a novel method of making an improved porous plate usable as a fuel cell electrode.

Further objects and advantages of this invention will be apparent from the following detailed description of certain presently-preferred embodiments thereof, shown in the accompanying drawings.

Figure 1:
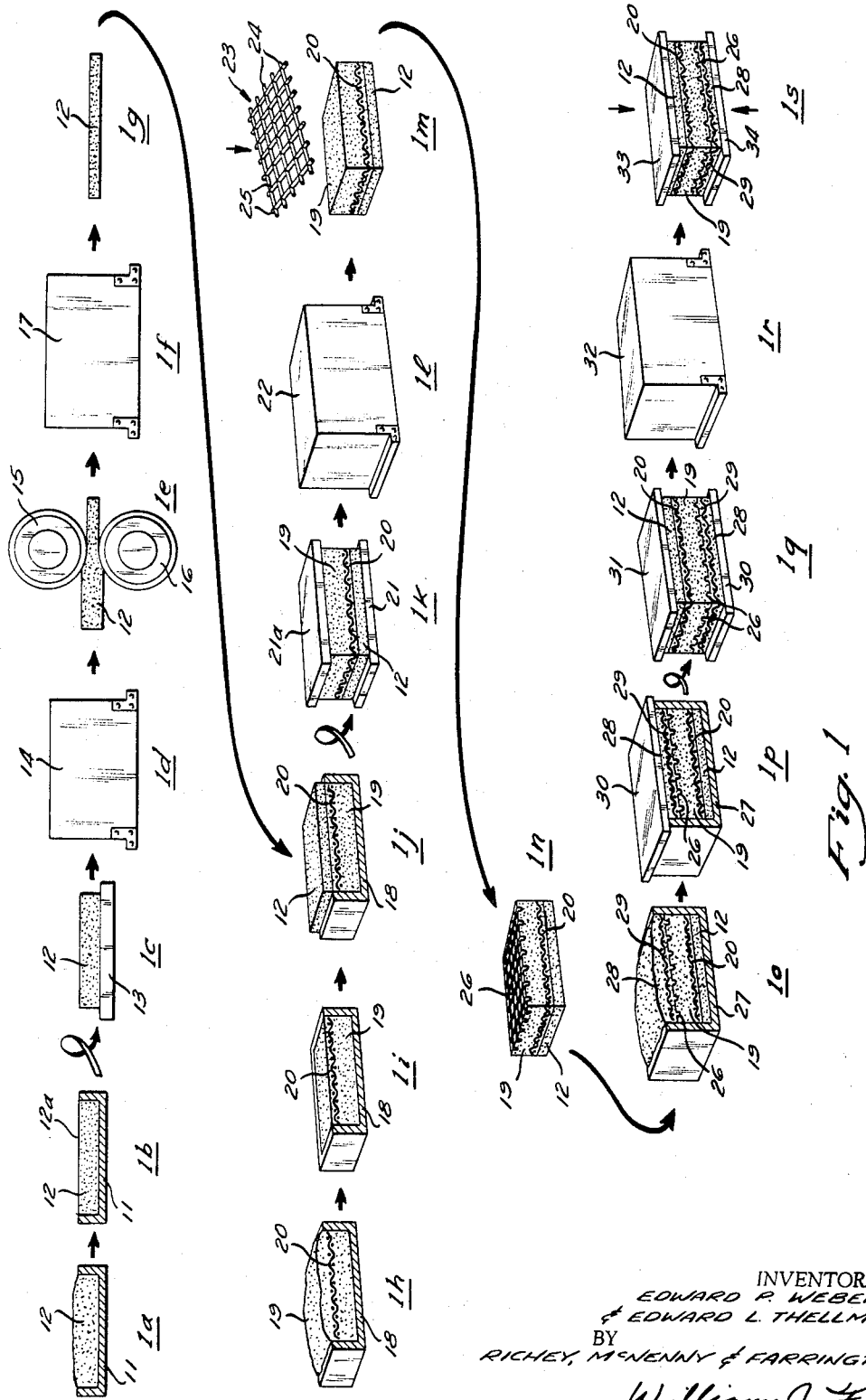
FIGURE 1 shows schematically the steps involved in one embodiment of the method of making a porous plate in accordance with the present invention.

Referring to FIGURE 1, in accordance with the method shown therein a mold 11 (position 1a) is filled with fine powder particles of the metal 12, such as nickel, which is to be used as the inner layer of the fuel cell electrode. After being filled, the mold 11 is vibrated so as to evenly distribute the metal particles. Then the excess particles disposed above the top of the mold are struck off, so that the top surface 12a of the mass of metal particles 12 is substantially flat and even with the top of the mold (position 1b). Following this, the mold 11 is turned upside down on a flat plate 13 (position 1c) and is then removed, leaving the loosely packed powder particles 12 in place on the plate 13. Then the plate 13 with the powder particles 12 thereon is inserted into a furnace 14 (position 1d) in which the metal particles 12 are sintered. Following this, the sintered sheet 12 is recoved from the furnace and is passed between opposed rolls 15 and 16 (position 1e), which compact the sintered sheet and reduce its thickness. The sintered and rolled sheet 12 is then inserted into another sintering furnace 17 (position 1f) for final flattening and clean up.

A second mold 18 (position 1h) is filled with a mass of powder particles 19 of the same metal. In a preferred embodiment, particles 19 are of substantially larger size than the particles 12 in the inner layer, although they may be of substantially the same size if a single porosity plate is desired. A substantially flat reinforcing screen 20 is provided in this mass of particles 19, preferably close to the top of the mold 18. Then the mold 18 is vibrated to distribute the metal particles 19 evenly and the excess metal particles above the top of the mold are struck off position 1i). Following this, the sintered and rolled sheet 12 from position 1g is placed on top of the mass of coarse metal particles 19 in the mold 18 (position 1j). Following this, the mold 18 is turned upside down on a supporting plate 21 and the mold removed, leaving the sintered and rolled fine porosity sheet 12 on the bottom and the loosely packed coarse metal particles 19 on top (position 1k). A top plate 21a is placed over the coarse particles 19 and the entire assembly is put into a sintering furnace 22 (position 1l) in which the coarse particles 19 become bonded to each other and to one major face of the previously sintered and rolled fine porosity sheet 12. If desired, the fine porosity sheet 12 may be on top of the coarse particles 19 in the sintering furnace 22.

In accordance with the present invention, after the two-layer sintered block 12, 19 has been removed from the furnace 22, the opposite major face of the coarse porosity layer 19 is compacted in localized areas by a grid-like tool 23 (position 1m), which is shown as being composed of a plurality of interconnected rigid rods 24 and 25 which lie in a common plane and intersect one another perpendicularly. This tool is pressed against the outer face of the coarse pore layer 19, in a direction toward the inner layer 12, so as to form a grid pattern of narrow grooves 26 in this outer face. Beneath these grooves the coarse pore layer has localized densely compacted regions which greatly enhance the structural rigidity and strength of the coarse pore layer.

The resultant two-layer block (position 1n) is inserted into a third mold 27, after which particles 28 of the same metal are poured in (position 1o). Preferably, the particles 28 are at least as coarse as the particles 19 in the second layer. A reinforcing screen 29 is provided at any desired location in the particles 28, preferably close to the groove face of the underlying layer 19. Then this mold is vibrated to distribute the metal particles evenly and to compact them loosely. Following this, the excess particles 28 above the top of the mold are struck off and a place 30 is laid over the top of the mold 27 (position 1p). Next, the entire assembly is inverted and the mold 27 is removed, leaving the loosely packed layer of coarse particles 28 and the two-layer block 19, 12 overlying the plate 30. Then a top plate 31 is placed over the assembly (position 1q). The entire assembly is put into a sintering furnace 32 (position 1r) in which the particles of the coarse pore outer layer 28 become bonded to each other and the outer layer 28 becomes bonded to the coarse pore middle layer 19. After the three-layer sintered block has been removed from the sintering furnace it is finally compacted in a press which, as shown, has plates 33 and 34 disposed above and below the three-layer sintered block (position 1s).

Figure 3:
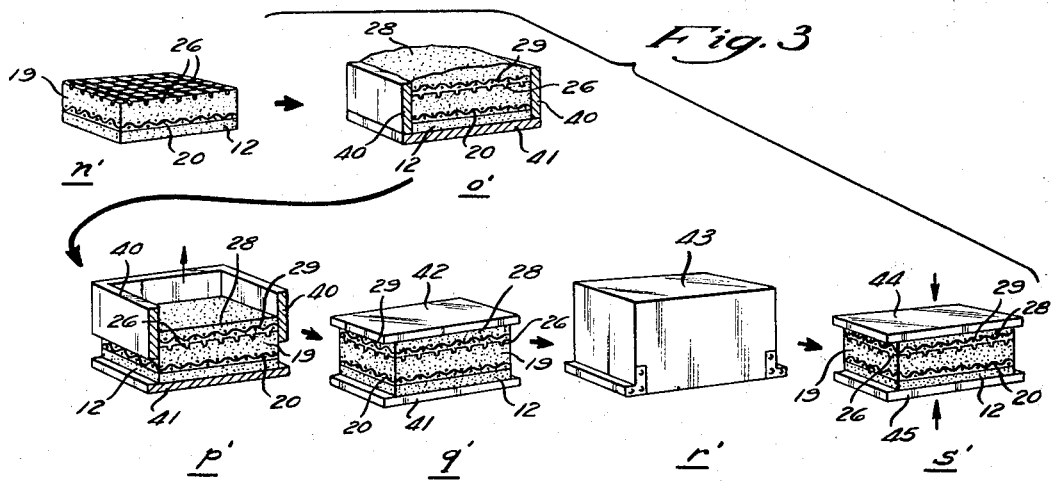
FIGURE 3 shows the concluding steps in an alternative embodiment of the method of the present invention.

FIGURE 3 shows the concluding steps in an alternative embodiment of the present method. In this embodiment the two-layer block will have been prepared in accordance with the steps shown in positions 1a through 1n in FIGURE 1. This two-layer block is shown at position n' in FIGURE 3.

This two-layer block is inserted in a mold (position $o'$) having interconnected sides 40 which are separable (as a unit) from the bottom 41. The powder particles 28, which are to make up the third layer, are poured into this mold on top of the grooved face of the layer 19. Then, the mold is vibrated to distribute these powder particles evenly and compact them loosely. Following this, the excess particles above the top of the mold are struck off and the sides 40 of the mold are removed (position $p'$). Then a top plate 42 is laid over the top of the assembly (position $q'$) and the assembly is put into a sintering furnace 43 (position $r'$) in which the particles 28 become bonded to each other and to the middle layer 19. The sintered three-layer block then is removed from the furnace and is finally compacted in a press 44, 45 (position $s'$).

Figure 2:
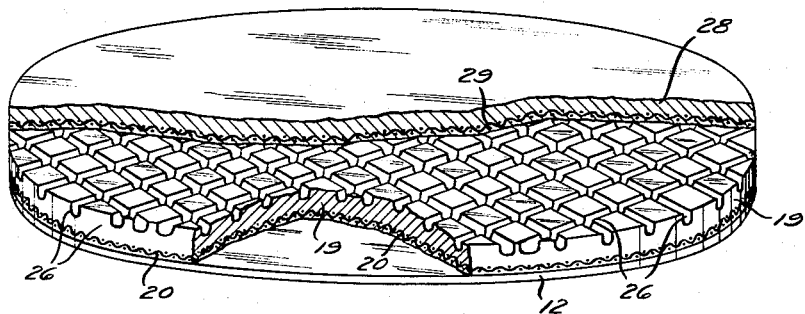
FIGURE 2 is a perspective view, with parts broken away for clarity, showing the porous plate produced by the method of FIGURE 1.

FIGURE 2 illustrates a finished product produced by either embodiment of the foregoing method. In one specific embodiment, the fine pore, inner layer 12 of nickel powder had a thickness of substantially .006 inch, with over 90% of its pores less than 3 microns in diameter, with the pore peak (i.e., the greatest number of pores) being about 2 microns, and with an overall porosity of about 43%.

In this particular embodiment, the sintered nickel powder middle layer 19, just before the grid-like compacted pattern 26 is formed, had a porosity of 86.4%, with 79% of its pores being within the range from 5 to 20 microns in diameter and the peak being about 13 microns.

In the finished three-layer plate of this particular embodiment, the middle layer 19 had, in the regions between its grid-like compacted pattern 26, a porosity of substantially 70% with over 80% of its pores being within the range from 3 to 12 microns in diameter and a pore peak of about 7 microns. At its grid-like, densely compacted regions, the middle layer 19 had a porosity lower than 70%, depending upon the degree of compaction provided at position $1m$ (FIGURE 1).

The middle layer 19 should be substantially thicker than the inner layer 12. In the particular embodiment under discussion its thickness was .070 inch, which was several times the thickness of the inner layer 12. Due to its thickness and the fact that it has the densely compacted portions under the grid-pattern of the recesses or indentations 26, the middle layer provides the required structural rigidity and mechanical strength for the three-layer plate. In the remaining portions (at the interstices between its grid-pattern of densely compacted portions) the middle layer has a porosity substantially greater than that of the inner layer 12, and has most of its pores substantially largr than those of the inner layer 12.

The outer layer 28 of the finished three-layer plate preferably has a porosity and pore side substantially the same as those of the portions of the middle layer 19 between the densely compacted grid-pattern thereon. However, if desired, the outer layer 28 may have a higher porosity and a larger pore size than those portions of the middle layer 19. Its porosity and pore size should be at least as great as those of the portions of the middle layer 19 which are not densely compacted.

Since the middle layer 19 provides the required structural strength and rigidity, the outer layer 28 may be thin and structurally weak. In the particular example previously mentioned, the outer layer 28 had a thickness of .025 inch.

With the foregoing construction the finished three-layer plate has a high mechanical strength and has sufficient rigidity to withstand deflection of deformation perpendicular to its major faces when subjected to the pressure differential existing in fuel cells. In order to provide the required strength and rigidity for any particular fuel cell application, the middle layer 19 can be compacted to any desired extent at the grooves 26.

While a specific presently-preferred embodiment of the invention has been shown and described, it is to be understood that various modifications departing from the disclosed embodiment may be adopted without departing from the spirit and scope of the invention. For example, the densely compacted portions of the middle layer may have a pattern different from the particular grid pattern shown.

If desired, the highly compacted grid-pattern may be provided in the outer layer 28 of the plate, preferably at the face of layer 28 which is bonded to the middle layer 19. In such event, the outer layer 28 is the backing layer in the plate and is substantially thicker than either of the other layers 12 and 19 so as to provide the desired structural strength and rigidity for the plate.

For some applications the outer layer 28 may be omitted entirely, the finished plate being constituted by only the inner layer 12 and the backing layer 19 therefor. Also, either or both of the reinforcing screens 20, 29 may be replaced by a reinforcing plate of expanded metal or the like. Also, if desired, the entire multiple-layer plate may be of a single porosity instead of multiple porosity, as described.

What is claimed is:

1. A multiple-porosity plate usable as a fuel cell electrode comprising a thin, fine porosity, sintered metal powder inner layer for contact with the fuel cell electrolyte, a coarse porosity sintered metal powder middle layer bonded to the back of said inner layer, said middle layer having a plurality of portions thereof which are densely compacted and regularly distributed throughout substantially the entire area of said layer and having between said densely compacted portions a plurality of remaining portions of substantially greater thickness and lower density than said densely compacted portions, said remaining portions of the middle layer having greater pore size and a substantially greater porosity than said inner layer, said middle layer throughout its extent being substantially thicker than said inner layer, and a coarse porosity sintered metal powder outer layer bonded to the back of said middle layer and having a porosity and pore size at least substantially as great as said remaining portions of the latter.

2. A multiple-porosity plate usable as a fuel cell electrode comprising a thin, fine porosity, sintered metal powder inner layer for contact with the fuel cell electrolyte, a coarse porosity sintered metal powder middle layer bonded to the back of said inner layer, said middle layer having a grid-pattern of narrow regions thereof which are densely compacted and regularly distributed throughout substantially the entire area of said layer and a plurality of remaining portions at the interstices of the grid-pattern which are of substantially greater thickness and lower density than said densely compacted regions, said remaining portions of the middle layer having a greater pore size and a substantially greater porosity than said inner layer, said middle layer throughout its extent being substantially thicker than said inner layer, and a coarse porosity sintered metal powder outer layer bonded to the back of said middle layer and having a porosity and pore size at least substantially as great as said remaining portions of the latter.

3. A method of making a multiple-porosity plate usable as a fuel cell electrode comprising the steps of sintering a thin, fine porosity, metal powder inner layer, sintering to one major face of said inner layer a substantially thicker metal powder middle layer having a porosity substantially greater than that of said inner layer and a pore size larger than that of said inner layer and having a reinforcing member embedded therein in close proximity to said inner layer, compacting a grid-pattern of narrow intersecting regions of said middle layer at its opposite major face in a direction toward said inner layer to provide regularly distributed densely compacted regions in said middle layer throughout substantially the entire area of said layer which enhance its rigidity and strength, and sintering to said opposite major face of said middle layer a metal powder outer layer having a porosity at least substantially as great as that of the portions of said middle layer between its densely compacted regions.

References Cited
UNITED STATES PATENTS 2,708,211 5/1955 Koren et al. _____ 136—29
2,776,331 1/1957 Chapman _____ 136—75
2,914,596 11/1959 Gorin et al. _____ 136—120
3,068,311 12/1962 Chambers et al. _____ 136—120

FOREIGN PATENTS 871,950 7/1961 Great Britain.

HOWARD S. WILLIAMS, *Primary Examiner.*

W. VAN SISE, *Assistant Examiner.*